3,635,887
ROOM TEMPERATURE VULCANIZABLE SILICONE RUBBER WITH UNPRIMED ADHESION
Keith E. Polmanteer, Midland, Mich., assignor to Dow Corning Corporation, Midland, Mich.
No Drawing. Filed Dec. 29, 1969, Ser. No. 888,940
Int. Cl. C08f 11/04
U.S. Cl. 260—46.5 G
9 Claims

ABSTRACT OF THE DISCLOSURE

A mixture of an uncured room temperature vulcanizable silicone rubber and an organosilicon compound having an organic radical with a —COOH group and a silicon-bonded hydrolyzable group gives a silicone rubber with improved unprimed adhesion to a variety of substrates when cured. An example of the organosilicon compound is an organosilane of the formula $(CH_3O)_3Si(CH_2)_3S(CH_2)_2COOH$ This invention relates to room temperature vulcanizable silicone rubber compositions with improved unprimed adhesion to substrates.

One problem faced by the user of room temperature vulcanizable silicone rubber is its faliure to strongly adhere to various materials, such as glass and metals. To form a strong bond between the room temperature vulcanizable silicone rubber and glass or metal, the materials are primed prior to the application of the room temperature vulcanizable silicone rubber to provide the necessary adhesion. The present invention overcomes this adhesion problem by providing a room temperature vulcanizable silicone rubber with improved adhesion to unprimed surfaces.

The present invention relates to a curable composition consisting essentially of (A) an uncured room temperature vulcanizable silicone rubber which is curable through reaction of a non-halogen silicon-bonded hydrolyzable group with a silicon-bonded hydroxyl or water containing (B) from 0.1 to 10 parts by weight of an organosilicon compound consisting of at least one silicon atom, at least one organic radical bonded to a silicon atom through a silicon-carbon bond having at least one —COOH group, said organic radical composed of carbon atoms and other elements selected from the group consisting of hydrogen atoms, carbon-bonded halogen atoms, carbon-bonded oxygen atoms, oxygen atoms bonded to a carbon atom and a hydrogen atom, carbon-bonded nitrogen atoms, nitrogen atoms bonded to both carbon atoms and hydrogen atoms, carbon-bonded sulfur atoms and sulfur atoms bonded to a carbon atom and a hydrogen atom, said organic radical having no more than 18 carbon atoms in any one uninterrupted carbon chain, each silicon atom having at least one silicon-bonded hydrolyzable group, any remaining unsatisfied bonds of any silicon atom being satisfied by a radical selected from the group consisting of monovalent hydrocarbon radicals, halogenated monovalent hydrocarbon radicals and divalent oxygen atoms bonding silicon atoms together, the amount of (B) present being based on 100 parts by weight of an organosiloxane base polymer.

The key component of the present invention is organosilicon compound (B). The organosilicon compound (B), can be any compound having at least one silicon atom, at least one organic radical bonded to a silicon atom through a silicon-carbon bond where the oragnic radical has a —COOH group and each silicon atom has at least one silicon-bonded hydrolyzable group. The organic radical is composed of carbon atoms and the other elements are selected from hydrogen atoms, oxygen atoms, nitrogen atoms, sulfur atoms, halogen atoms including fluorine, chlorine, bromine and iodine. The elements other than carbon are all bonded to carbon atoms where all the valence bonds are bonded to carbon atoms or where at least one valence bond is bonded to carbon and the remaining valence bonds are bonded to hydrogen atoms. For example, sulfur can be bonded to two carbon atoms to form ≡C—S—C≡ or one carbon atom >C=S or one carbon atom and one hydrogen atom ≡C—S—H. The organic radical has no more than 18 carbon atoms in any one uninterrupted carbon chain. For purposes of this invention, the organic radical will contain no more than 18 carbon atoms unless the carbon chain is interrupted by oxygen atoms, sulfur atoms or nitrogen atoms and where such elements interrupt the carbon chain, each uninterrupted carbon chain will contain no more than 18 carbon atoms.

The organosilicon compounds (B), can be a silane, a siloxane or mixtures thereof, where the siloxane can be a homopolymer, a copolymer or a mixture thereof.

The monovalent hydrocarbon radicals can be any radical such as alkyl radicals such as methyl, ethyl, propyl, isopropyl, butyl, pentyl, isopentyl, neopentyl, hexyl, octyl, dodecyl, octadecyl, 3-methylheptyl, 6-butyloctadecyl, tertiary butyl, myricyl and 2,2-diethylpentyl; alkenyl radicals such as, vinyl, allyl, hexenyl, butenyl, 3-octenyl, 4,9-octadecadienyl and 4-nonenyl; alkynyl radicals such as propynyl, heptynyl, butynyl, decynyl; alkenynyl radicals such as 1- penten-3-ynyl, 2-ethyl-1-buten-3-ynyl; cycloaliphatic radicals such as, cyclobutyl, cyclopentyl, cyclohexyl, cycloheptyl, propylcyclohexyl, 2,4-dimethylcyclopentyl, cyclohexenyl, bicyclo[3.1.0]hexyl, tricyclo[3.2.1.1$^{3,8}$]-5-nonenyl, spiro[4.5]decyl, dispiro[4.1.4.2]-1-tridecenyl, decahydronaphthyl, 2,3-dihydroindyl and 1,2,3,4-tetrahydronaphthyl; aryl radicals such as phenyl, tolyl, xylyl, 3-ethylphenyl, xenyl, naphthyl, anthracyl, pentacenyl, 3,4-methylethylphenyl, 9,9'-bifluoryl and 4-m-terphenyl; and aralkyl radicals such as 2-phenyl-octyl, 3-methyl-2-(4-isopropylphenyl)heptyl, benzyl, 2-ethyltolyl, 2-ethyl-p-cymyl, diphenylmethyl, 4,5-diphenylpentyl, 2-phenylethyl and 2-phenylpropyl.

The halogenated monovalent hydrocarbon radical can be any radical such as aliphatic radicals such as chloromethyl, 3-chloropropyl, 3,3,3-trichloropropyl, perfluorovinyl, chlorooctadecyl or radicals of the formula $R_fCH_2CH_2$— where $R_f$ can be any perfluoroalkyl radical such as trifluoromethyl, perfluoroethyl, perfluoroisobutyl, perfluoroheptyl or perfluorooctadecyl; aromatic radicals such as dichlorophenyl, tetrabromoxenyl, tetrachlorophenyl, alpha, alpha,alpha-trifluorotolyl or iodonaphthyl; cycloaliphatic radicals such as chlorocyclohexyl, bromocyclopentyl or chlorocyclohexenyl and aralkyl radicals such as chloro benzyl, beta-(chlorophenyl)ethyl or beta-(iodophenyl) ethyl or beta-(bromophenyl)propyl.

The hydrolyzable group can be any group such as halogen atoms such as F, Cl, Br or I; groups of the formula —OZ when Z is any hydrocarbon or halogenated hydrocarbon group such as methyl, ethyl, isopropyl, octadecyl, allyl, hexenyl, cyclohexyl, phenyl, benzyl, beta-phenylethyl, 2-chloroethyl, chlorophenyl, 3,3,3-trifluoropropyl or bromocyclohexyl; any hydrocarbon ether radical such as 2-methoxyethyl, 2-ethoxyisopropyl, 2-butoxyisobutyl, p-methoxyphenyl or —(CH$_2$CH$_2$O)$_2$CH$_3$; any acyl radical such as acetyl, propionyl, benzoyl, cyclohexoyl, acrylyl, methacrylyl, stearyl, naphthoyl, trifluoroacetyl, chlorobenzoyl or bromopropionyl; or any N,N-amino radical such as dimethylamino, diethylamino, ethylmethylamino, diphenylamino, or dicyclohexylamino. X can also be any amino radical such as NH$_2$, dimethylamino, diethylamino, methylphenylamino or dicyclohexylamino; any ketoxime radical of the formula —ON=CM₂ or —ON=CM' in which M is any monovalent hydrocarbon or halogenated hydrocarbon radical such as those shown for Z above and M' in any divalent hydrocarbon radical both valences of which are attached to the carbon, such as hexylene, pentylene or octylene; ureido groups of the formula

—N(M)CONM''₂ in which M is defined above and M'' is H or any of the M radicals; carbamate groups of the formula —OOCNMM'' in which M and M'' are defined above, or carboxylic amide radicals of the formula —NMC=O(M'') in which M and M'' are defined above. X can also be the sulfate group or sulfate ester groups of the formula —OSO₂(OM) where M is defined above; th e cyano group; the isocyanate group; and the phosphate group or phosphate ester groups of the formula —OPO(OM)₂ in which M is defined above.

The term "hydrolyzable group" means any group attached to the silicon which is hydrolyzed by water at room temperature.

The organic radical having a —COOH group and bonded to the silicon atom through a silicon-carbon bond can be illustrated by

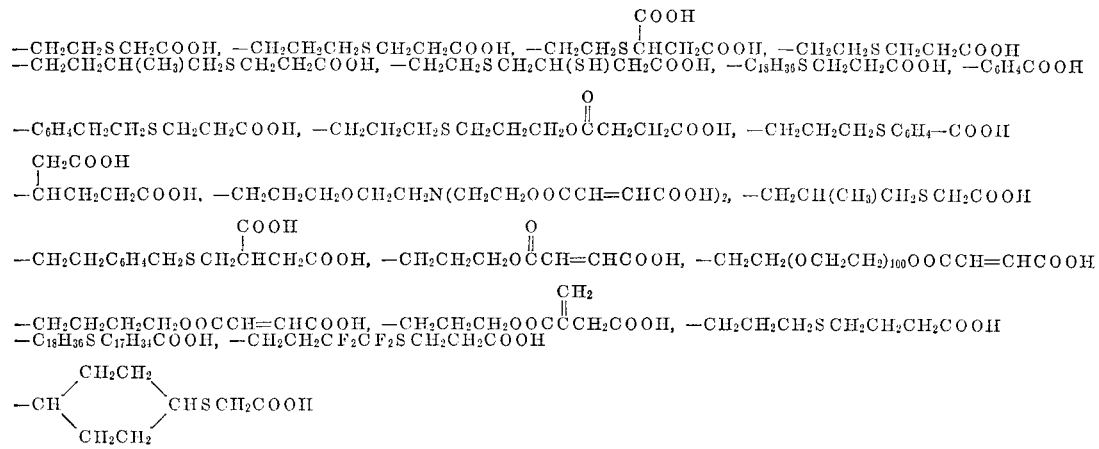

and —CH₂CH₂CH₂NHCH₂CH₂NHCH₂CH₂COOH.

The organosilicon compounds (B) can be prepared by methods known in the art, such as those described in Organosilicon Compounds, by C. Eaborn, Butterworths Scientific Publication, London, 1960, in particular chapter 14 beginning on page 377. Other methods can be found in U.S. Pat. No. 2,805,237, U.S. Pat. No. 3,179,612, U.S. Pat. No. 3,387,016, Journal of the Chemical Society, Part C, by C. Eaborn et al., volume 17, 1966, pages 1524–7, and U.S. Pat. No. 2,823,218. The method disclosed in U.S. Pat. No. 2,823,218 reacts a silicon compound bearing an ≡Si—H function with an unsaturated compound in the presence of chloroplatinic acid. When this method is used, it is recommended that the acid function be blocked prior to the reaction for best results. Such blocking includes the use of triorganosilyl groups, the triorganosilyl groups being preferentially hydrolyzed after said reaction. Organosilicon compounds (B), can also be prepared by the method described in an application by Gary E. Le Grow, Ser. No. 888,939, filed Dec. 29, 1969, entitled "Carboxy-functional Hydrolyzable Silanes" filed concurrently herewith, which is hereby incorporated by reference. One method involves the addition of a carboxylic acid having alkenyl unsaturation to a mercaptohydrocarbylsilane in which the SH group is attached to the silicon through a carbon atom. If the acid is conjugated, such as acrylic acid, care should be taken to avoid polymerization of the acid during the reaction. The use of a base catalyst such as sodium methoxide prevents undue polymerization. Free radical generators can also be used and are particularly effective when the acids are not conjugated. Another method involves the addition of mercaptocarboxylic acids such as thioglycolic acid to an alkenyl silane such as allylsilane. This addition can be carried out in the presence of a free radical generator. The temperatures used will depend upon the nature of the ingredients, particularly the free radical generators. The references described above are hereby incorporated by reference for so much as describes the preparation of organosilicon compounds having carbon functional carboxylic acid groups and the carbon functional carboxylic acid containing organosilicon compounds.

Siloxanes containing carbon functional carboxylic acid groups, both homopolymers and copolymers can be prepared from any of the silanes by partial hydrolysis.

The organosilicon compound (B) is present in an amount from 0.1 to 10 parts by weight per 100 parts by weight of an organosiloxane base polymer in (A). Preferably, the organosilicon compound (B) is present in an amount from 1 to 5 parts by weight.

The uncured room temperature vulcanizable silicone rubbers which are curable through reaction of a non-halogen silicon-bonded hydrolyzable group with a silicon-bonded hydroxyl or water (A) are well known in the art and can be purchased commercially. The uncured compositions of (A) can be either one component or two component room temperature vulcanizable silicone rubbers. One component includes those room temperature vulcanizable silicone rubbers which can be stored in one container under anhydrous conditions and when exposed to moisture cure to a silicone rubber. Two component includes those room temperature vulcanizable silicone rubbers which are stored in two or more containers and when the components of the containers are mixed the mixture cures to a silicone rubber. One component room temperature vulcanizable silicone rubber cures by the interaction of a silicon-bonded hydrolyzable group with water and a two component room temperature vulcanizable silicone rubber cures by the interaction of silicon-bonded hydroxyls and silicon-bonded hydrolyzable groups with or without the presence of water. The silicon-bonded hydrolyzable groups in (A) can be any of the hydrolyzable groups defined above except those hydrolyzable groups which have halogen atoms bonded to silicon atoms.

The uncured room temperature vulcanizable silicone rubbers of (A) can be illustrated by the following well known systems.

A composition comprising a hydroxyl endblocked diorganopolysiloxane, an alkoxysilicon compound, such as alkoxysilanes, reaction product of a tin salt of a carboxylic acid and an alkyl silicate, alkoxydisilane, organic silicate, polyvinylalkoxysilane, bis(alkoxysilyl) hydrocarbon compound, cellosolvoxysilane, and partial hydrolyzates thereof, and a catalyst such as a metal salt of a carboxylic acid, a condensation product of an aliphatic aldehyde and an aliphatic primary amine, organozirconates, organotitanates, organosiloxy titanates, amines and the like as further shown by Koch in U.S. Pat. No. 2,833,742, by Berridge in U.S. Pat. No. 2,843,555, by Chipman in U.S. Pat. No. 2,902,467, by Polmanteer in U.S. Pat. No. 2,927,907, by Page et al. in U.S. Pat. No. 2,983,694, by British patent specification No. 913,295, by Nitzsche et al. in U.S. Pat. No. 3,065,194, by Smith in U.S. Pats. Nos. 3,109,826 and 3,110,689, by Brown et al. in U.S. Pat. No. 3,122,522, by Nitzsche et al. in U.S. Pat. No. 3,127,363, by Ceyzeriat et al. in U.S. Pat. No. 3,151,099, by Berridge in U.S. Pat. No. 3,154,515, by Brown et al. in U.S. Pats. Nos. 3,161,614 and 3,170,894, by Smith in U.S. Pat. No. 3,165,494, by Weyenberg in U.S. Pats. Nos. 3,175,993, 3,294,739 and 3,334,067, by Lewis et al. in U.S. Pat. No. 3,186,963, by Lampe in U.S. Pat. No. 3,305,502, and by Tarno in Canadian Pat. No. 772,677.

A composition comprising a polydiorganosiloxane containing silicon-bonded hydroxyls, an organohydrogensiloxane as a cross-linker and a catalyst such as a stannous salt of a carboxylic acid, other metallic salts of carboxylic acids, organic acids and the like, as further shown by Selfridge in Canadian Pat. No. 576,680, by Nitzsche et al. in U.S. Pats. Nos. 2,999,077, 3,070,559, 3,070,566 and 3,127,363. A composition which foams comprising a polydiorganosiloxane containing both silicon-bonded hydroxyls and silicon-bonded hydrogen atoms and a stannous salt of a carboxylic acid with or without additional hydroxylated compounds as further shown by Bruner in Canadian Pat. No. 577,528 and U.S. Pat. No. 3,070,555 and by Joyce in U.S. Pat. No. 2,956,032.

A composition comprising a hydroxyl containing diorganopolysiloxane and an organotriacyloxysilane, or an organoacyloxysiloxane with or without a catalyst such as a metallic salt of a carboxylic acid, such as dibutyltindilaurate, as shown further by Russell (includes magnesium oxide) in U.S. Pat. No. 3,061,575, by Ceyzeriat in U.S. Pat. No. 3,133,891, by Nitzsche et al. (includes an anhydride of a saturated aliphatic carboxylic acid) in U.S. Pat. No. 3,240,731, by Dupree in U.S. Pat. No. 3,274,145, by Selin (uses an organoacyloxydisilane as acyloxy silicon compound) in U.S. Pat. No. 3,277,047, by Goossens in U.S. Pat. No. 3,338,868, by Knaub in U.S. Pat. No 3,338,951, and by Beers in U.S. Pat. No. 3,382,205. A composition comprising an acyloxy functional organopolysiloxane with or without catalysts, as further shown by Bruner (diacyloxy terminated polydiorganosiloxanes) in U.S. Pats. Nos. 3,035,016 and 3,077,465, by Haluska (polydiorganosiloxanes terminated by acyloxy silyl groups bonded to the polydiorganosiloxane chain through divalent hydrocarbon radicals) in U.S. Pat. No. 3,109,013, by Vaughn (an organopolysiloxane-polycarbonate block copolymer with acyloxy silyl terminating groups) in U.S. Pat. No. 3,419,635, by Chadha et al. (cyclo-triacyloxy tetrasiloxy endblocked polydiorganosiloxanes) in U.S. Pat. No. 3,440,205 and by Pande et al. (trialkylsiloxy endblocked, acyloxy siloxanes) in U.S. Pat. No. 3,440,206.

A composition comprising a hydroxyl endblocked organopolysiloxane, a ketoxime functional silane, a carboxylic acid anhydride and magnesium oxide as further shown by Russell et al. in U.S. Pat. No. 3,184,427. A composition comprising a ketoxime functional organopolysiloxane further shown by Sweet in U.S. Pat. No. 3,189,576, and an organopolysiloxane-polycarbonate block copolymer terminated with ketoxime functionality further shown by Vaughn in U.S. Pat. No. 3,419,635.

A composition comprising a hydroxyl endblocked polydiorganosiloxane and aminosilanes or aminosilazanes as further shown in Nitzsche et al. in U.S. Pats. Nos. 3,032,528, 3,065,194 and 3,127,363, by Goossens in U.S. Pat. No. 3,338,868 and by Knaub in U.S. Pat. No. 3,441,534.

A composition comprising an organopolysiloxane containing silicon-bonded hydroxyl radicals and an aminoxy silicon compound as further shown by Murphy in U.S. Pats. Nos. 3,341,486, 3,379,659 (elastomeric foams) and 3,441,583 (shows additional aminoxy silicon compounds), by Boissieras et al. in U.S. Pat. No. 3,318,898, by Vaughn in U.S. Pat. No. 3,419,635 and by Knaub in U.S. Pat. No. 3,441,534.

A composition comprising an organo tri-isothiocyanatosilane and a liquid silanol chain-stopped diorganopolysiloxane as disclosed by Meals in U.S. Pat. No. 3,269,982.

Other room temperature vulcanizable silicone rubbers are disclosed by Frankland in U.S. Pat. No. 3,280,072, by Smith et al. in U.S. Pat. No. 3,293,204, by Kulpa in U.S. Pat. No. 3,296,161, by Goossens in U.S. Pat. No. 3,296,195, by Di Paola in U.S. Pats. No. 3,355,480, No. 3,364,175 and No. 3,385,823.

The room temperature vulcanizable silicone rubbers described above have a base polymer which is, for the most part, a polydiorganosiloxane. The base polymer, in some cases, also contains the cross-linking agent in the form of non-halogen silicon-bonded hydrolyzable groups on the terminating silicon atoms. Base polymers of this type are the bulk of the one component room temperature vulcanizable silicone rubbers and cure by exposure to moisture. In other cases, particularly the two component systems, the base polymer is a hydroxyl terminated polydiorganosiloxane. In this case, the mixture contains a separate cross-linking agent and cures when the two are mixed. Many of the room temperature vulcanizable silicone rubbers cure at ambient conditions without a catalyst, however, in most compositions a catalyst is desirable to accelerate the cure. The room temperature vulcanizable silicone rubber compositions can also contain any of the fillers and additives which are well known and described in the prior art.

The uncured room temperature vulcanizable silicone rubber (A), and the organosilicon compound (B), are mixed by any convenient method used in the preparation of the silicone rubber composition, preferably the organosilicon compound (B), is added at the same time as the cross-linking agent and the organosilicon compounds of (B), can be used as a part of the cross-linking agent and the organosilicon compounds of (B), which contain no silicon-bonded halogen atoms, can be used as a total substitute for the cross-linking agent.

The compositions of the present invention increase the adhesive bond between the cured silicone rubber and the substrate to provide in most cases a bond which fails only cohesively. Whereas most of the room temperature vulcanizable silicone rubbers will adhere to various substrates, to some extent, they have at most a weak adhesive bond to many substrates, for example, metals such as aluminum. The cured compositions of the present invention have improved adhesion to a wide variety of substrates, as illustrated by glass, ceramics, wood, aluminum, stainless steel, titanium, other metals, epoxy resin, and the like. The cured compositions of the present invention have particularly excellent adhesion to metals such as aluminum where any failure is usually cohesive failure.

The following examples are illustrative only and should not be construed as limiting the present invention which is properly delineated in the claims. In the following examples all parts are parts by weight unless otherwise stated.

EXAMPLE 1

Homogeneous mixtures of room temperature vulcanizable silicone rubber as defined below were prepared. Five beads of each uncured composition were placed on a 4 inch by 6 inch aluminum panel and 0.25 inch wide aluminum foil strips about 12 inches long where about 6 inches is in contact with the bead were placed over each bead and pressed to provide a 0.125 inch thickness of the uncured composition between the panel and the strip. The aluminum panels and aluminum foil strips were previously cleaned with trichloroethylene and methylisobutylketone. The assembly was then allowed to cure at ambient atmospheric conditions for the time specified in Table I. After the composition cured, a razor blade was used to cut down to the panel through any cured composition which extended beyond the aluminum foil strip, so that the adhesion would be determined on the defined area of the strip and not influenced by excess cured silicone rubber. The strips were then pulled at a 180° angle on an Instron tester at the rate of 2 inches per minute. The adhesion test is further defined by ASTM–D–903 test procedure. The results are in pounds per linear inch (p.l.i.) which will be referred to as the peel strength and the type of failure was observed as either cohesive failure or adhesive failure. Adhesive failure is failure of the adhesive bond between the substrate and the cured composition where no cured composition remains on the aluminum substrate. Cohesive failure is the failure of the cured composition where the cured composition fails and leaves cured composition on the aluminum substrate.

The composition was 100 parts of a hydroxyl endblocked polydimethylsiloxane having a viscosity of 13,000 cp. at 25° C.,
25 parts $(CH_3)_3SiO_{0.5}$ treated reinforcing silica filler,
X parts of ethyl ortho silicate,
Y parts of $(CH_3O)_3SiCH_2CH_2CH_2SCH_2CH_2COOH$, and
Z parts of dibutyltindilaurate

TABLE I

| Parts of— | | | Adhesion after— | | | |
|---|---|---|---|---|---|---|
| | | | 1 week cure | | 1 month cure | |
| X | Y | Z | P.l.i. | Failure | P.l.i. | Failure |
| 1 | 3 | 0 | 1.0 | 0.2 | Adhesive | 0.8 | Adhesive |
| 2 | 3 | 0.5 | 1.0 | 70.0 | Cohesive | 72.0 | Cohesive |
| 3 | 3 | 1.0 | 1.0 | 70.0 | ---do--- | 75.0 | Do |
| 4 | 3 | 2.0 | 1.0 | 76.0 | ---do--- | 70.0 | Do. |
| 5 | 0 | 0.67 | 3.0 | 28.0 | ---do--- | 36.0 | Do. |
| 6 | 0 | 1.34 | 3.0 | 64.0 | ---do--- | 70.0 | Do. |
| 7 | 0 | 2.01 | 3.0 | 74.4 | ---do--- | 80.0 | Do. |
| 8 | 0 | 3.00 | 3.0 | 60.0 | ---do--- | 80.0 | Do. |
| 9 | 0 | 6.70 | 3.0 | 60.0 | ---do--- | >100.0 | Do. |

For comparative purposes, the following room temperature vulcanizable silicone rubber compositions were prepared and the adhesion tested as described above.

100 parts of a hydroxyl endblocked polydimethylsiloxane defined above,
25 parts of the silica defined above,
3 parts of a cross-linker as shown in Table II, and
1 part of dibutyltindilaurate

TABLE II

| | Cross-linker | Adhesion* (p.l.i.) after— | |
|---|---|---|---|
| | | 1 wk. cure | 1 mo. cure |
| 1 | $(CH_3O)_3SiCH_2CH(CH_3)CH_2C(CH_3)_3$ | 0.16 | 0.21 |
| 2 | $(CH_3O)_3SiCH_2CH_2CH_2SCH_2CH_2COOCH_3$ | 0.12 | 0.20 |
| 3 |  $(CH_3O)_3SiCH_2CH_2CH_2SCH_2CH_2OCH_2CHCH_2$ (epoxide) | 0.16 | 0.60 |
| 4 | $(CH_3O)_3SiCH_2CH_2CH_2SCH_2CH_2CN$ | 0.12 | 0.12 |
| 5 | $(CH_3O)_3SiCH_2CH_2CH_2SH$ | 0.8 | |

*All the failures were adhesive failures.

The composition as defined above by No. 8 of Table I was used to test the adhesion to other substrates. In place of the above defined aluminum panel, panels of the substrates as shown in Table III were used. The results of Table III were after one week's cure at ambient atmospheric conditions. All the failures were cohesive failures.

TABLE III

| Substrate: | Adhesion, p.l.i. |
|---|---|
| (1) Titanium | 78.0 |
| (2) Stainless steel | 80.0 |
| (3) Glass | 70.0 |

EXAMPLE 2

The following mixtures were prepared and then tested for adhesion as described in Example 1. The results were as recorded in Table IV. The cure was at ambient conditions for one week 76.34 parts of a hydroxy endblocked polytrifluoropropylmethylsiloxane having a viscosity of 40,000 cs. at 25° C.
15.27 parts of the silica defined in Example 1,
.76 part of lampblack,
7.63 parts of vinyltriacetoxysilane, and
X parts of $(CH_3O)_3SiCH_2CH_2CH_2SCH_2CH_2COOH$.

TABLE IV

| | Adhesion | |
|---|---|---|
| Parts of X | P.l.i. | Failure |
| 0.00 | 0.96 | Adhesive. |
| 0.25 | 13.2 | Cohesive. |
| 2.00 | 12.0 | Do. |

EXAMPLE 3

The following mixtures were prepared and then tested for adhesion as described in Example 1. The results were as recorded in Table V. The cure was at ambient conditions for one week.

90.70 parts of a polydimethylsiloxane having

$$CH_3[(CH_3CH_2)(CH_3)C=NO]_2SiO_{0.5}$$

endblocking units and a viscosity of about 10,000 cs. at 25° C.
8.05 parts of fume silica,
.96 part of titanium dioxide,
.29 part of dibutyltindioctoate, and
X parts of $(CH_3O)_3SiCH_2CH_2CH_2SCH_2CH_2COOH$.

TABLE V

| | Adhesion | |
|---|---|---|
| Parts of X | P.l.i. | Failure |
| 0.00 | 0.4 | Adhesive. |
| 0.25 | 28.0 | Cohesive. |
| 0.50 | 28.0 | Do. |
| 1.00 | 38.0 | Do. |
| 2.00 | 36.0 | Do. |

A composition having the same formulation as described above except 0.8 part of $$(CH_3COO)_3SiCH_2CH_2SCH_2COOH$$

was used instead of the

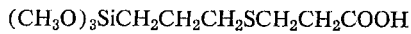
$$(CH_3O)_3SiCH_2CH_2CH_2SCH_2CH_2COOH$$

Curing at room temperature for two weeks and using the same test procedure, the silicone rubber had a 20 p.l.i. peel strength and failed cohesively. Aluminum was the substrate.

EXAMPLE 4

The following mixtures were prepared and then tested for adhesion as described in Example 1. The results were as recorded in Table VI. The cure was at ambient conditions for one week.

70.64 parts of a polydimethylsiloxane having $$CH_3(CH_3O)_2SiO_{0.5}$$

endblocking units and a viscosity of 10,000 cs. at 25° C.,
24.24 parts of the silica filler described in Example 1,
2.42 parts of titanium dioxide,
.21 part of carbon black,
2.08 parts of methyltrimethoxysilane,
0.34 part of titanium acetylacetonate,
0.07 part of copper acetylacetonate, and
X parts of $(CH_3O)_3SiCH_2CH_2CH_2SCH_2CH_2COOH$.

TABLE VI

| Parts of X | Adhesion P.l.i. | Failure |
|---|---|---|
| 0.0 | 2.5 | Adhesive. |
| 1.0 | 80.0 | Cohesive. |

The resulting silicone rubber had a tensile strength at break of 575 p.s.i. and an elongation at break of 600%. A composition having the same formulation as described above except 0.8 part $$(CH_3COO)_3SiCH_2CH_2SCH_2COOH$$

was used instead of $$(CH_3O)_3SiCH_2CH_2CH_2SCH_2CH_2COOH$$

The same test procedure was used and the cured silicone rubber had a 80 p.l.i. peel strength and failed cohesively.

EXAMPLE 5

A mixture of 100 parts of the hydroxyl endblocked polydimethylsiloxane as described in Example 1, 25 parts of the silica described in Example 1, 3 parts of a trimethylsiloxane endblocked polymethylhydrogensiloxane having an average of 34 silicon atoms per molecule, 1.0 part of dibutyltindilaurate and 1.0 part of $$(CH_3O)_3SiCH_2CH_2CH_2SCH_2CH_2COOH$$

when allowed to cure for one week at room temperature in the adhesion test conditions as described in Example 1 using an aluminum substrate had 84 p.l.i. peel strength and failed cohesively. The same formulation without $$(CH_3O)_3SiCH_2CH_2CH_2SCH_2CH_2COOH$$

had a peel strength of 0.1 p.l.i. and failed adhesively under the same test conditions.

EXAMPLE 6

A mixture of 100 parts of the hydroxyl endblocked polydimethylsiloxane as described in Example 1, 25 parts of the silica described in Example 1, 4 parts of ethylpolysilicate having 67.7 weight percent ethoxy groups, 1.0 part of dibutyltindilaurate and 1.0 part of $$(CH_3O)_3SiCH_2CH_2SCHCH_2COOH$$
$$\qquad\qquad\qquad\qquad\quad |$$
$$\qquad\qquad\qquad\qquad\ COOH$$

when allowed to cure for 6 days at room temperature using an aluminum substrate using the adhesion test of Example 1 had 48 p.l.i. peel strength and failed cohesively. The same formulation without $$(CH_3O)_3SiCH_2CH_2SCHCH_2COOH$$
$$\qquad\qquad\qquad\qquad\quad |$$
$$\qquad\qquad\qquad\qquad\ COOH$$

had a peel strength of 0.1. p.l.i. and failed adhesively under the same test conditions.

EXAMPLE 7

A mixture of 100 parts of the hydroxyl endblocked polydimethylsiloxane as described in Example 1, 25 parts of the silica described in Example 1, 5 parts of a mixture of 50 weight percent methyltriacetoxysilane and 50 weight percent ethyltriacetoxysilane, and 1.0 part of $(CH_3O)_3SiCH_2CH_2CH_2SCH_2CH_2COOH$ when allowed to cure for one week at room temperature using an aluminum substrate using the adhesion test of Example 1 had 60 p.l.i. peel strength and failed cohesively. The same formulation without the $$(CH_3O)_3SiCH_2CH_2CH_2SCH_2CH_2COOH$$

had a peel strength of 12 p.l.i. and failed adhesively.

EXAMPLE 8

A mixture of 100 parts of the hydroxyl endblocked polydimethylsiloxane as described in Example 1, 3 parts of $$(CH_3O)_3SiCH_2CH_2CH_2NHCH_2CH_2NHCH_2CH_2COOH$$

and 1.0 part of dibutyltindilaurate, when allowed to cure one week at room temperature using an aluminum substrate using the adhesion test of Example 1 had 32 p.l.i. peel strength and failed cohesively.

EXAMPLE 9

A mixture of 100 parts of the hydroxyl endblocked polydimethylsiloxane as described in Example 1, 25 parts of the silica as described in Example 1, 3 parts of ethylorthosilicate, 1.0 part of $$(CH_3O)_2(CH_3)SiCH_2CH_2CH_2SCH_2CH_2COOH$$

and 1.0 part dibutyltindilaurate when allowed to cure three weeks at room temperature using an aluminum substrate using the adhesion test of Example 1 had 17 p.l.i. peel strength and failed cohesively. A composition having the same formulation as described above except that instead of $$(CH_3O)_2(CH_3)SiCH_2CH_2CH_2SCH_2CH_2COOH$$

1.0 part of $(CH_3O)_2(CH_3)SiCH_2CH_2SCH_2COOH$ was used. Using the same test procedure, except curing for two weeks at room temperature, the cured silicone rubber had a 40 p.l.i. peel strength and failed cohesively on an aluminum substrate. Another composition having the same formulation as described above except that instead of $$(CH_3O)_2(CH_3)SiCH_2CH_2CH_2SCH_2CH_2COOH$$

a polymer of the unit formula $$(HOOCCH_2CH_2SCH_2CH_2CH_2)(CH_3O)SiO$$

was used. Using the same test procedure, except curing for two weeks at room temperature, the cured silicone rubber had a 36 p.l.i. peel strength and failed cohesively on an aluminum substrate.

EXAMPLE 10

When any one of the following organosilicon compounds are substituted for $$(CH_3O)_3SiCH_2CH_2CH_2SCH_2CH_2COOH$$

in Example 1, equivalent results are obtained.

(A) $[(CH_3)_2C\!=\!NO]_3SiCH_2CH_2CH_2SCH_2CH_2COOH$
(B) $(CH_3O)(C_6H_5)_2SiCH_2CH_2CH_2SCH_2CH_2COOH$
(C) $(CH_3CH_2O)_3SiCHCH_2CH_2COOH$
$\qquad\qquad\qquad\qquad\ |$
$\qquad\qquad\qquad\quad\ CH_2COOH$
(D) $F_2(CH_3)Si\!-\!\!\!\left\langle\!\!\!\bigcirc\!\!\!\right\rangle\!\!-\!COOH$
(E) $(CH_3O)_3SiCH_2CH_2CH_2OCH_2CH_2N(CH_2CH_2OOCCH\!=\!CHCOOH)_2$
(F) $(CH_3O)_3SiCH_2CH(CH_3)CH_2SCH_2COOH$
(G) $[(CH_3)_2C\!=\!NO]_2(CH_3)SiCH_2SCH_2CH(CH_3)COOH$
(H) $(CH_3O)_3SiC_6H_4SCH_2CH_2C_6H_4COOH$
(I) $(C_6H_{13}O)(CH_3)_2SiCH_2CH_2C_6H_4CH_2SCH_2CHCH_2COOH$
$\qquad\qquad\qquad\qquad\qquad\qquad\qquad\qquad\qquad\quad\ |$
$\qquad\qquad\qquad\qquad\qquad\qquad\qquad\qquad\qquad\ COOH$
(J) $(C_2H_5COO)_2(C_6H_5)SiCH_2CH_2CH_2SCH_2CH_2COOH$
(K) $(CH_3O)_2(CF_3CH_2CH_2)SiCH_2CH_2CH_2SCH_2CH_2COOH$
(L) $(CH_3O)_2(C_6H_4Cl)SiCH_2CH_2CH_2SCH_2CH_2COOH$
(M) $(CH_3CH_2O)_3SiC_{18}H_{36}SC_{17}H_3COOH$
(N) $(CH_3O)_3SiCH_2CH_2CH_2OOCCH\!=\!CHCOOH$
(O) $(CH_3O)_3SiCH_2CH_2CH_2O\overset{O}{\underset{\|}{C}}\!-\!\overset{CH_2}{\underset{\|}{C}}CH_2COOH$ That which is claimed is:

1. A curable composition consisting essentially of (A) an uncured room temperature vulcanizable silicone rubber which is curable through reaction of a non-halogen silicon-bonded hydrolyzable group wtih a silicon-bonded hydroxyl or water containing (B) from 0.1 to 10 parts by weight of an organosilicon compound consisting of at least one silicon atom, at least one organic radical bonded to a silicon atom through a silicon-carbon bond having at least one —COOH group, said organic radical composed of carbon atoms and other elements selected from the group consisting of hydrogen atoms, carbon-bonded halogen atoms, carbon-bonded oxygen atoms, oxygen atoms bonded to a carbon atom and a hydrogen atom, carbon-bonded nitrogen atoms, nitrogen atoms bonded to both carbon atoms and hydrogen atoms, carbon-bonded sulfur atoms and sulfur atoms bonded to a carbon atom and a hydrogen atom, said organic radical having no more than 18 carbon atoms in any one uninterrupted carbon chain, each silicon atom having at least one silicon-bonded hydrolyzable group, any remaining unsatisfied bonds of any silicon atom being satisfied by a radical selected from the group consisting of monovalent hydrocarbon radicals, halogenated monovalent hydrocarbon radicals and divalent oxygen atoms bonding silicon atoms together, the amount of (B) present being based on 100 parts by weight of an organosiloxane base polymer.

2. The composition in accordance with claim 1 in which the organosilicon compound (B), is present in an amount of from 1 to 5 weight percent.

3. The composition in accordance with claim 1 in which the organosilicon compound (B) is (CH$_3$O)$_3$SiCH$_2$CH$_2$CH$_2$SCH$_2$CH$_2$COOH 4. The composition in accordance with claim 1 in which the organosilicon compound (B), is (CH$_3$COO)$_3$SiCH$_2$CH$_2$SCH$_2$COOH 5. The composition in accordance with claim 1 in which the organosilicon compound (B), is (CH$_3$O)$_3$SiCH$_2$CH$_2$SCHCH$_2$COOH
                              |
                             COOH 6. The composition in accordance with claim 1 in which the organosilicon compound (B), is (CH$_3$O)$_3$SiCH$_2$CH$_2$CH$_2$NHCH$_2$CH$_2$NHCH$_2$CH$_2$COOH 7. The composition in accordance with claim 1 in which the organosilicon compound (B), is (CH$_3$O)$_2$(CH$_3$)SiCH$_2$CH$_2$CH$_2$SCH$_2$CH$_2$COOH 8. The composition in accordance with claim 1 in which the organosilicon compound (B), is (CH$_3$O)$_2$(CH$_3$)SiCH$_2$CH$_2$SCH$_2$COOH 9. The composition in accordance with claim 1 in which the organosilicon compund (B), is a polysiloxane of the unit formula (HOOCCH$_2$CH$_2$SCH$_2$CH$_2$CH$_2$)(CH$_3$O)SiO References Cited
UNITED STATES PATENTS

| | | | |
|---|---|---|---|
| 3,143,524 | 8/1964 | Cooper et al. | 260—46.5 |
| 3,177,178 | 4/1965 | Bluestein | 260—46.5 |
| 3,208,973 | 9/1965 | Bluestein | 260—46.5 |
| 3,338,943 | 8/1967 | Speier | 260—448.2 |

DONALD E. CZAJA, Primary Examiner

M. I. MARQUIS, Assistant Examiner

U.S. Cl. X.R.

117—123 D, 124 F, 135.1 R, 138.8 R, 143 A; 161—193 R, 207 R; 260—2.55, 185, 375 B, 46.5 E, 46.5 Y, 825 R